Patented Jan. 30, 1945

2,368,522

UNITED STATES PATENT OFFICE 2,368,522

LUBRICATED RUBBER COMPOSITIONS

Mead Cornell, Cleveland, Ohio, and Gotthold Harry Meinzer, Glendale, Calif.; said Meinzer assignor to said Cornell No Drawing. Application August 14, 1944,
Serial No. 549,478

10 Claims. (Cl. 260—23)

This invention relates to rubber and rubber-like compositions having intrinsic lubricating properties, and to methods for producing the lubricating characteristic in said compositions.

Articles formed from rubber, both natural and synthetic, and in various stages of vulcanization, are used in many situations in which there is a sliding or rubbing contact between the article and a metallic surface. Examples of such uses are rod and piston packings, packing and bearing retainers, grommets and grease retainers, seals in which a rubber ring surrounds a revolving shaft, and the like.

In such situations, the high coefficient of friction between rubber and a polished metal surface is extremely disadvantageous, and many attempts to reduce it by embodying a lubricating agent in the rubber have been made. Solid lubricants such as talc and graphite have been used, without producing any material improvement in this regard unless used in such quantities that other properties of the rubber are seriously depreciated. Oils and greases have been compounded with rubber but they interfere seriously with vulcanization and the combination is too unstable to be useful. Paraffin and other waxes impart temporarily the desired lubricating property but such additions render the rubber brittle and inelastic at normal temperatures and drain out of the formed article at slightly elevated temperatures, the paraffin being present in mechanical mixture and separating out when its melting point is reached. So far as we are aware, the problem of reducing the friction between a rubber article and a metallic surface has not heretofore found any satisfactory solution.

We have discovered that rubbers, whether natural or synthetic, may be lubricated both externally and internally, by compounding with them a hydrocarbon wax modified by the addition under suitable conditions of a small proportion of lithium stearate. The rubber so compounded is stable over a wide range of temperature, has a normal or even an increased resilience, has a low coefficient of friction against metals, is highly resistant to oxidation and is adapted to many uses to which rubbers have not heretofore been put or in which they have given less than the optimum service.

The modified hydrocarbon wax just referred to is not of itself a part of our invention, but as it is not yet an article of commerce, its preparation and relevant properties will be described.

A hydrocarbon wax such as paraffin, ceresin, ozokerite or montan wax is fused and blended with dry, granulated lithium stearate. The mixture is then further heated, with stirring, to the temperature of solution or reaction, which is usually of the order of 400° Fahr. The completion of the solution or reaction is indicated by the liquefaction and clarification of the gel first formed.

The product of this reaction has a much enhanced melting point: for example, the addition of 2% by weight of the stearate raises the melting point of a semirefined petroleum paraffin from 128° to about 310°; 5% of the stearate increases the melting point to about 350°, and an addition of 20% to about 390° Fahr. The wax is also rendered much tougher and acquires a flexibility which the unmodified wax does not possess, this property becoming more marked as the dosage of stearate increases.

For the purpose of this invention we prefer to use from 5% to 15% of lithium stearate with 95% to 85% wax, though this is by no means a limit. With highly refined waxes as little as 2% by weight of the stearate may be used while with soft and oily waxes, such as paraffin scale or ozokerite it may be desirable to increase the dosage to 25% or even more. As the stearate is the more expensive constituent of the modified wax, it will be used as sparingly as possible. Doses up to 50% appear to have no detrimental effects.

In making up a rubber composition, the modified wax is milled with the rubber and other ingredients of the composition which, after suitable milling, is molded and vulcanized in the usual manner. Fragmentation or comminution of the wax prior to addition somewhat reduces the milling load and time but is not essential. The quantity of modified wax thus introduced may vary over a considerable range and we have obtained good results for various purposes in the use of from 2% to as much as 20% of the weight of rubber. Ordinarily a dosage of modified wax equal to about 10% of the weight of rubber in the composition is sufficient to impart the desired new characteristics to the finished product.

The modified wax is compatible with lamp black, carbon black, zinc oxide, sulfur, accelerators and antioxidants, in brief, with all the ingredients customarily used to adapt the rubber to specific purposes. Its addition therefore requires no change in formulation, the desired quantity of wax being merely added to a predetermined formula.

When a bearing or similar article formed from rubber compounded with a modified wax as above described is brought into rubbing contact with a metallic surface, its coefficient of friction is substantially that of the wax itself. That is to say, the friction between the bearing and a shaft revolving in it is approximately equal to that which would exist, under equal conditions of speed and load, between the shaft and a bearing formed entirely of the wax. The submicroscopic structure of the wax-containing rubber is not known, but it is evident that there is at least a loose structural combination of the wax with the rubber. Be that as it may, the compounded bearing element maintains a very thin film of the wax on the metal-contacting surface, and this film persists during the life of the bearing.

While the coefficient of friction of the rubber compositions above described is low enough for most purposes, it is sometimes desirable to reduce it still further, by the addition of a lubricating oil or of a so-called "torque-reducing" agent, or both.

If a lubricating oil be used, it is preferable to blend it with the molten wax before adding the lithium stearate, the mixture including the stearate being then heated to reaction temperature as above described. In this further modified wax the added oil is in stable combination with and becomes part of the wax, incapable of separation or of being separated. The oil selected should be a well refined petroleum lubricating oil, having a high viscosity index and the viscosity which would be selected for the lubrication of a metal to metal bearing at the same speed and load. The oil + wax + stearate product, which may contain 10% lubricating oil, 10% lithium stearate and 80% wax (these figures being exemplary only) is a hard, tough and somewhat flexible solid, having a melting point slightly below that of a 10% stearated wax free from oil but far above that of the wax itself. This product is worked into the rubber composition in the manner above described.

Articles formed from rubber compositions containing the above combination of stearated wax with lubricating oil will not bleed during vulcanization, the oil being firmly retained by the modified wax. In the application of such compositions to bearings (using this word in the sense of any rubber articles contacting a relatively moving metallic surface) a film of lubricant is permanently maintained at the contact surface and the frictional resistance, particularly in the low temperature range, is lower than in the use of a modified wax free from oil. This modification is adapted to situations in which the load is light and the relative speed is high.

The stearated wax itself is fully compatible with natural rubber as well as with the synthetic rubbers and shows no tendency to swell or deteriorate the composition. The addition of mineral oil in moderate proportions, for example up to a proportion equal to that in which the stearate is present in the wax, does not destroy this compatibility, the stearated wax acting in some manner not understood to inhibit the deteriorating effect which the oil would otherwise have on natural rubber. In the use of larger proportions of oil, however, it is desirable to have recourse to one of the more oil-resistant synthetics, as for example Ameripol, Thiokol, neoprene or Perbunan, which are examples of rubbery polymers containing polymerized butadiene and polychloroprene preparations.

The "torque-reducing" agents above referred to are substances which reduce the interfacial tension between hydrocarbon lubricants and metal and thus promote the wetting of the metallic surface by the hydrocarbon with which it is in contact. Free fatty acids have this property moderately developed but are not well adapted to our purpose because of their tendency to oxidize and the risk of corrosion and are not claimed herein. We have obtained the best results with a proprietary substance known commercially as "Dupont GD162", which is reputed to be a phosphated lauryl alcohol, and with the substance known commercially as "Paraflow," which is said to be a chlorinated naphthalene, but other agents having torque-reducing properties may be substituted.

These agents are added to the modified wax, with or without the addition of lubricating oil, in minute quantity, as for example of the order of 0.1% to 0.5% of the weight of the modified wax. The agent may be introduced into the molten wax at any stage of its fabrication.

The addition of the modified wax to the rubber composition does not retard vulcanization, nor does it interfere with vulcanizing to any desired degree of firmness or hardness. In formulating compositions to be hard vulcanized, however, liquid lubricants should be used with some caution as excessive quantities may cause leakage in curing. This risk will not be incurred if the quantity of liquid lubricant does not exceed the quantity of lithium stearate in the modified wax, and in some cases a greater quantity of oil than this may be used.

The lubrication provided by the addition to the rubber composition of the modified wax is not confined to the contacting surface but is also an internal lubrication, manifested in a reduction in the tendency to heat under repeated deformation. This property is particularly useful and valuable in the fabrication of automobile tires from some of the synthetic rubbers (as for example, Buna S) which are well known to be defective in this regard.

The tendency to heat at high speed may be reduced materially by compounding with the synthetic rubber a small proportion (e. g., from 2% to 5% by weight) of a modified wax containing a fairly large proportion (e. g., from 10% to 20%) of lithium stearate. The addition to the wax of a liquid lubricant should, of course, be avoided in this application. The wax-compounded rubber may be used both for saturating the cords and for forming the side-wall, breaker strip and friction stock of the tire.

For the same reasons, rubber compositions compounded with the above described modified wax are particularly adapted to the fabrication of rubber belts of both flat and V form. In these structures the rubber used between the canvas plies and for external coatings is subject to extreme deformation and such belts, when made with the use of synthetic rubbers, give poor service by reason of internal heating, with consequent oxidation and over-vulcanization. The lubrication of the rubber composition by the modified wax reduces the heating tendency to a marked degree and correspondingly lengthens the useful life of the belt.

Such lubricated compositions are also highly useful in the manufacture of suspension blocks for railway cars and spring pads and shackle bushings for motor vehicles. Such blocks and pads are subjected to heavy loads and rapid vibration, and are often short-lived by reason of internal heating. This may be much reduced or even obviated by compounding the rubber with the modified wax as described in connection with automobile tires.

The reduction in the rate of oxidation which has been observed in the use of these lubricated rubber compositions may possibly be due to the lower temperature at which they operate, but is believed to be in part due to the exclusion of air from the surface of the rubber article by the highly impervious film of substantially non-oxidizable wax maintained on the surface of the article.

We claim as our invention:

1. The method of imparting a lubricating property to a substance selected from the group consisting of natural rubber, rubbery polymers containing polymerized butadiene, and polychloroprene which comprises, compounding with a major proportion of the substance prior to fabricating, a hydrocarbon wax modified by heating the wax with from 2% to 50% of lithium stearate until a liquefied clear product is obtained.

2. The method of imparting a lubricating property to a substance selected from the group consisting of natural rubber, rubbery polymers containing polymerized butadiene, and polychloroprene which comprises, compounding with a major proportion of the substance prior to fabricating, a hydrocarbon wax modified by heating the wax with from 2% to 50% of lithium stearate and not more than 10% of a petroleum lubricating oil until a liquefied clear product is obtained.

3. The method of imparting a lubricating property to a substance selected from the group consisting of natural rubber, rubbery polymers containing polymerized butadiene, and polychloroprene which comprises, compounding with a major proportion of the substance prior to fabricating, a hydrocarbon wax modified by heating the wax with from 2% to 50% of lithium stearate and with a non-oxidizing wetting agent which will reduce the interfacial tension between hydrocarbon lubricants and metal until a liquefied clear product is obtained.

4. A composition of matter consisting of a major part of a substance selected from the group consisting of natural rubber, rubbery polymers containing polymerized butadiene, and polychloroprene, and a minor part of a modified hydrocarbon wax obtained by heating the wax with from 2% to 50% of lithium stearate until a liquefied clear product is obtained, said composition having a lower coefficient of friction than said substance but otherwise having the properties inherent in said substance.

5. A composition of matter consisting of a major part of a substance selected from the group consisting of natural rubber, rubbery polymers containing polymerized butadiene, and polychloroprene, and a minor part of a modified hydrocarbon wax obtained by heating the wax with from 2% to 50% of lithium stearate and with not more than 10% of a petroleum lubricating oil until a liquefied clear product is obtained, said composition having a lower coefficient of friction than said substance but otherwise having the properties inherent in said substance.

6. A composition of matter consisting of a major part of a substance selected from the group consisting of natural rubber, rubbery polymers containing polymerized butadiene, and polychloroprene, and a minor part of a modified hydrocarbon wax obtained by heating the wax with from 2% to 50% of lithium stearate and with a non-oxidizing wetting agent which will reduce the interfacial tension between hydrocarbon lubricants and metal until a liquefied clear product is obtained, said composition having a lower coefficient of friction than said substance but otherwise having the properties inherent in said substance.

7. A fabricated resilient article having its resilient portions composed in major part of a vulcanized substance selected from the group consisting of natural rubber, rubbery polymers containing polymerized butadiene, and polychloroprene and in minor part of a modified hydrocarbon wax obtained by heating the wax with from 2% to 50% of lithium stearate until a liquefied clear product is obtained.

8. A fabricated resilient article having its resilient portions composed in major part of a vulcanized substance selected from the group consisting of natural rubber, rubbery polymers containing polymerized butadiene, and polychloroprene and in minor part of a modified hydrocarbon wax obtained by heating the wax with from 2% to 50% of lithium stearate and with not more than 10% of a petroleum lubricating oil until a liquefied clear product is obtained.

9. A fabricated resilient article having its resilient portions composed in major part of a vulcanized substance selected from the group consisting of natural rubber, rubbery polymers containing polymerized butadiene, and polychloroprene and in minor part of a modified hydrocarbon wax obtained by heating the wax with from 2% to 50% of lithium stearate and with a non-oxidizing wetting agent which will reduce the interfacial tension between hydrocarbon lubricants and metal until a liquefied clear product is obtained.

10. A composition of matter: a resilient mass consisting in major part of a vulcanizable substance selected from the group consisting of natural rubber, rubbery polymers containing polymerized butadiene, and polychloroprene and from 2% to 20% of a modified hydrocarbon wax obtained by heating the wax with from 2% to 50% of lithium stearate until a liquefied clear product is obtained, said mass being internally lubricated by said wax and having a reduced heating tendency as compared with the substance entering into its composition.

MEAD CORNELL.
GOTTHOLD HARRY MEINZER.